United States Patent
Low

[15] 3,648,152

[45] Mar. 7, 1972

[54] THERMAL TO ELECTRICAL POWER CONVERSION SYSTEM WITH SOLID-STATE SWITCHES WITH SEEBECK EFFECT COMPENSATION

[72] Inventor: George M. Low (Acting Administrator of the National Aeronautics and Space Administration with Respect to an Invention of Katsunori Shimada), 3840 Edgeview Drive, Pasadena, Calif. 91107

[22] Filed: Feb. 26, 1971

[21] Appl. No.: 119,282

[52] U.S. Cl. ........ 322/2, 310/2, 321/2

[51] Int. Cl. ........ H02n 5/00

[58] Field of Search ........ 310/2–4; 136/207, 136/208; 322/2; 321/2; 317/23529

[56] References Cited

UNITED STATES PATENTS

| | | | |
|---|---|---|---|
| 3,119,059 | 1/1964 | Hall et al. | 310/4 X |
| 3,381,201 | 4/1968 | Angello | 310/4 X |
| 3,532,960 | 10/1970 | Webb | 321/2 |

*Primary Examiner*—Thomas J. Kozma
*Assistant Examiner*—Ulysses Weldon
*Attorney*—Monte F. Mott, Paul F. McCaul and John R. Manning

[57] ABSTRACT

A thermal to electrical power conversion system is disclosed in which switching of electrical currents to a load is performed by solid-state switches in which their Seebeck effect reduces the losses due to the ohmic voltage drops thereacross. In a system with a thermoelectric generator as the power source, the switches are designed with their source electrodes formed by the generator's cold shoe at a temperature higher than a remotely located heat sink which forms the switches' drain electrodes. The gate electrodes of the switches are connected to an electronic switch controller, which controls their conduction and cutoff states.

11 Claims, 7 Drawing Figures

KATSUNORI SHIMADA
*INVENTOR.*

BY

ATTORNEYS

INVENTOR.
KATSUNORI SHIMADA

BY Paul J. McEvoy
Monte F. Mott

ATTORNEYS

THERMAL TO ELECTRICAL POWER CONVERSION SYSTEM WITH SOLID-STATE SWITCHES WITH SEEBECK EFFECT COMPENSATION

ORIGIN OF THE INVENTION

The invention described herein was made in the performance of work under a NASA contract and is subject to the provisions of Section 305 of the National Aeronautics and Space Act of 1958, Public Law 85-568 (72 STAT. 435; 42 USC 2,457).

BACKGROUND OF THE INVENTION

1. Field of the Invention

The present invention generally relates to a system for the conversion of thermal energy to electrical energy and, more particularly, to the switching of electrical energy produced from thermal energy to a load.

2. Description of the Prior Art

Extensive studies have been directed to the conversion of thermal energy to electrical energy. These studies have led to the development of thermionic and thermoelectric generators. Typically, the current produced by such generators is at a low-voltage level, which, for most applications, must be converted to a higher voltage. Some thermionic generators are connected in series to produce somewhat higher voltages. However, there is a practical limit to such series arrangements. A similar limit exists on the series connection of the junctions of dissimilar materials which can be placed in series in a thermoelectric generator.

Power conditioning generally involves the inversion or conversion of the low-DC voltage provided by either type generator to a higher voltage. Generally, this is accomplished by changing the small DC voltage to produce a current of alternating amplitude which is transformable to a higher voltage by a step-up transformer. Changing is accomplished by various switching techniques and arrangements.

As stated in U.S. Pat. No. 3,532,960, it is generally desirable to place the switching arrangement in the higher temperature environment near the generator, rather than remotely therefrom, in order to minimize losses due to relatively long power lines which would otherwise be required to connect the generator with the switching arrangement. In said patent, the use of thermionic diodes as switches located in the high-temperature environment of a thermionic generator is disclosed. Recent advances in technology make it possible to produce solid-state devices which can withstand the high temperature near a thermal to electrical energy generator. However, such devices have a serious drawback, represented by the internal voltage drop across their junctions, due to the current flowing therethrough, or drop which is often referred to as the ohmic voltage drop. Although this drop can be held to be as small as 0.1 volt, using the best available fabrication techniques, it is still very significant due to the large currents which pass through the solid state devices, and therefore such loss, unless minimized, greatly affects the overall energy conversion efficiency.

OBJECTS AND SUMMARY OF THE INVENTION

It is a primary object of the present invention to provide a new switching arrangement for a thermal to electrical energy conversion system.

Another object of the present invention is to provide a new solid-state switching arrangement located in the high temperature environment of a thermal to electrical energy conversion system.

A further object of the present invention is to provide a novel solid-state switching arrangement, located in the high-temperature environment of a thermal to electrical energy conversion system, which exhibits a minimum of power loss due to the currents, switched thereby.

These and other objects of the invention are achieved by providing an arrangement of solid-state switches in which the solid-state material is fabricated from semiconductor materials having a large Seebeck coefficient. The switches utilize waste heat emitted by the generator to produce Seebeck voltages which counteract the ohmic voltage drops in them. Thus, overall generator efficiency is increased significantly. The teachings of the present invention will hereafter be described in connection with a thermoelectric generator. However, it will be apparent from the following description that the present invention is also applicable for incorporation in a system in which a thermionic generator is employed.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
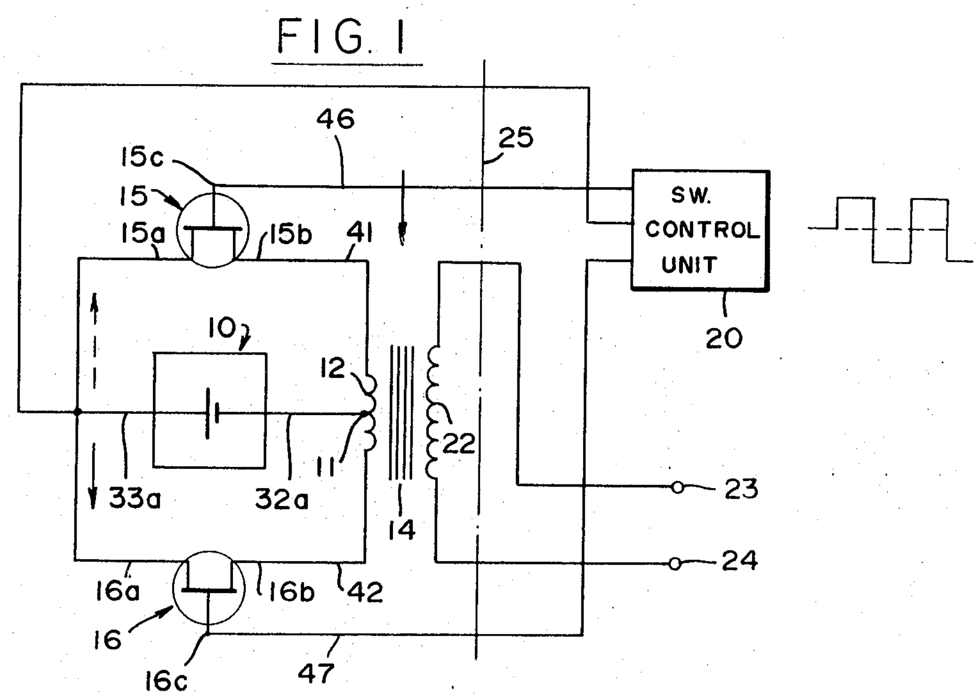
FIG. 1 is a general block and schematic diagram of a system in which the present invention is incorporated.

For a full understanding of the present invention and the problems which it overcomes, reference is first made to FIG. 1 which is one embodiment of a thermal to electrical energy conversion system in which the invention is employed. Therein, numeral 10 designates a thermoelectric generator connected at one output terminal to the center tap 11 of a primary winding 12 of a step-up transformer 14. The other output terminal of generator 10 is connected to one terminal of each of two solid-state switches 15 and 16. Each of the latter which is a three-terminal device has another terminal connected to an end of winding 12 and a control or gate terminal, connected to a switch control unit 20. The three terminals of each solid-state switch are designated by the switch's numeral followed by the suffixes *a*, *b* and *c*. The transformer's secondary winding, designated by numeral 22, across which the stepedup voltage is produced, provides the output voltage across output terminals 23 and 24. In FIG. 1, elements to the left of dashed line 25 are assumed to be in the high-temperature environment or zone and those to the right of line 25 in the low-temperature zone.

Figure 6:
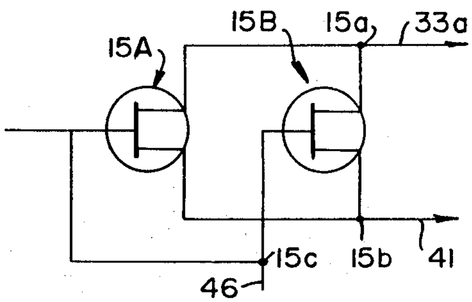
FIG. 6 is a schematic diagram of another embodiment of the switch.

As seen from a comparison of FIG. 1 of the instant application and FIG. 6 of the aforementioned U.S. Pat. No. 3,532,960, the system shown in FIG. 1 herein is functionally identical to that described in FIG. 6 of the patent. Therein, the switches 51 and 52 are in the high-temperature zone. Likewise in the instant invention the switches 15 and 16 are in the high-temperature zone. The major distinction between the two systems is that in the prior system, switches 51 and 52 are thermionic diodes, while in the present invention the switches 15 and 16 are solid-state three terminal switches. Furthermore, as will be described hereafter in detail, switches 15 and 16 are of a construction and type which minimize the power losses due to the flow of currents therethrough.

As previously pointed out, the present advances in technology make it possible to produce solid-state switches which can withstand the temperatures in the high-temperature zone. However, due to the high currents at low voltage provided by a generator, such as generator 10, the ohmic voltage drops across such switches results in excessive power losses. Thus, conventional high-temperature solid-state switches cannot be employed.

In accordance with the teachings of the present invention, switches 15 and 16 are fabricated and positioned relative to generator 10 to develop a high-Seebeck effect and thereby cancel or at least minimize the losses due to the ohmic voltage drops thereacross. The teachings may best be explained in conjunction with FIGS. 2–4.

Figure 2:
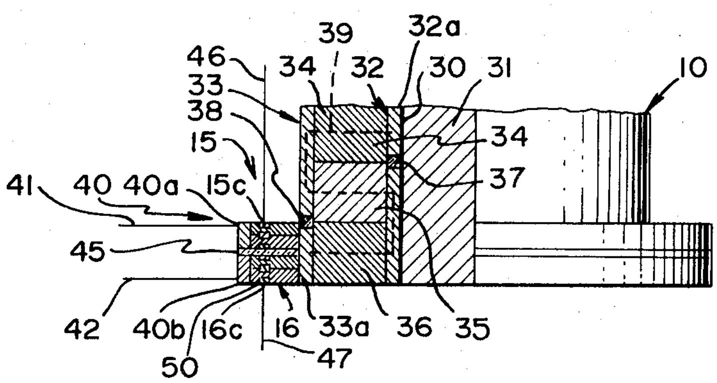
FIGS. 2 through 4 are diagrams useful in explaining the novel features of the present invention.

In FIG. 2, the thermoelectric generator 10 is shown having a cylindrical shape and comprising a hollow core 30 into which an appropriate heat source 31 is inserted. Source 31 may be a radioisotope fuel capsule which is inserted to be in contact with the core's outer wall 32. Wall 32 represents the generator's hot shoe. Spaced between hot shoe 32 and the generator's cold shoe 33 are a plurality (e.g., 3) of thermoelectric solid-state elements, designated by numerals 34–36. These are properly insulated by insulators 37 and 38 to insure proper current flow represented in FIG. 2 by dashed line 39. Therein, the hot shoe portion 32a represents one output terminal of the generator while the cold shoe portion 33a represents the other output terminal. For explanatory purposes let designations **33*a* and 32*a* represent the plus (+) and minus (−) terminals of the generator. The foregoing description of the generator 10** is assumed to represent a conventional thermoelectric generator and no novelty is attached thereto.

In accordance with the present invention the solid-state switches 15 and 16 are fabricated and placed between cold shoe portion **33*a* and a heat sink 40. Relating FIG. 2 to FIG. 1, the cold shoe portion 33*a* forms terminals 15*a* and 16*a* for switches 15 and 16, while heat sink portions 40*a* and 40b represent terminals 15*b* and 16*b* of the two switches, which are connected by leads 41 and 42 to the opposite ends of primary winding 11**.

As shown in FIG. 2, the two switches are insulated from one another by an insulator 45. Each is shown to be of the junction FET type with a plurality of gate regions 50, all of which are assumed to be tied externally to a common lead representing the switch gate terminal. In FIGS. 1 and 2, these terminals which are designated **15*c* and 16*c* are connected to the control unit 20 by lines 46 and 47 respectively. It is thus seen that terminals 15*a* and 16*a* which are the source electrodes of switches 15 and 16 respectively make direct contact to the plus (+) terminal of generator 10 at its cold shoe portion 33*a*, while the two separate heat sink portions 40*a* and 40*b* define the terminals 15*b* and 16*b*** which are the drain electrodes of the two switches.

Figure 4:
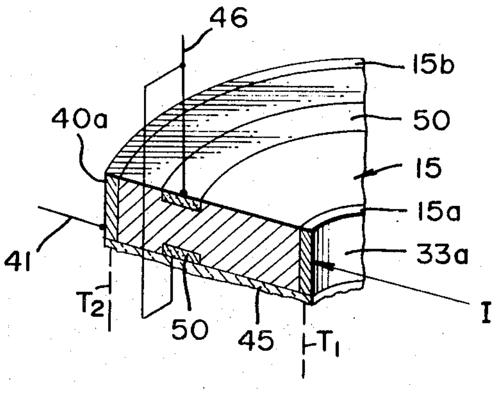

Although portion **33*a* of cold shoe 33 is at a lower temperature than the hot shoe 32, the former is still at a relatively high temperature, which is several hundred degrees higher than the heat sink 40. Thus, a temperature difference exists between the source and drain of each of switches 15 and 16. Assuming that the direction of current flow is as shown in FIG. 4, the solid-state material from which switches 15 and 16** are fabricated is chosen to have a large Seebeck coefficient so that due to the temperature difference across them the ohmic voltage drops are cancelled or at least greatly minimized.

The manner in which the power losses due to the ohmic voltage drop across each switch is at least minimized if not completely cancelled will now be explained. Assuming that the switch resistance between the source and drain is *r* ohms, the ohmic voltage drop is I*r*. However, a thermoelectric emf is generated across the switch which has a polarity that aids the current flow, and which can be expressed as $$\alpha(T_1-T_0),$$

where $\alpha$ is the effective Seebeck coefficient of the material and $T_1$ is the temperature of shoe portion **33*a*** which represents the source electrode and $T_0$ is the temperature of the heat sink portion, which represents the drain electrode and $T_1>T_0$. Thus, if $Ir=\alpha(T_1-T_0)$ full cancellation of the ohmic voltage drop is achieved.

The ratio between $\alpha$ and r should satisfy the relationship $$\frac{\alpha}{r}=\frac{I}{T_1-T_0}.$$

Assuming for simplicity that $r=\rho L/A$ where $L$ is the length of the switch, $A$ its cross-sectional area and $\rho$ its resistivity, $$\frac{\alpha}{\rho}=\frac{IL/A}{T_1-T_0}=\frac{JL}{T_1-T_0}.$$

Assuming that the current density through the switch $J$ equals $1A/\text{cm.}^2$ and $T_1-T_0=300°$ K., then $$\frac{\alpha}{\rho}=\frac{L}{300}.$$

Selecting $L$ to be 1cm.$\alpha/\rho=1/300$, a value which is easily attainable with the appropriate selection of the materials. For example several materials such as silicon and germanium have an $\alpha=3\times10^{-4}$ volt/° K. Thus $\rho$ should be about 0.09$\omega$—cm. or $9\times10^{-4}$ $\omega$-meter. Such a resistivity value is typical for any thermoelectric material having appropriate selection of a dopant and the degree of doping. Examples of dopants for silicon or germanium are indium, antimony, boron, aluminum, gallium and phosphor though others may be chosen. Pure silicon has a resistivity of 600$\omega$-*m*., while a transistor doped silicon has a resistivity of about $1\times10^{-2}$ $\omega$-*m*. Clearly, by an increased doping the desired resistivity value is easily achievable, with state of the art techniques.

Herebefore, it was assumed that $T_1-T_0$ is about 300° K. This temperature is easily attainable. In a thermoelectric generator the temperature of the portion **33*a*** is in the range of 300° C. or 573° K., while in a thermionic generator it is about 700° C. or 973° K. Thus, the heat sink portion or the drain electrode need be maintained at about 0° C. or 400° K. for a temperature difference of 300° C. As previously pointed out in a thermoelectric generator, the source electrodes are at and/or part of the cold shoe of the generator. In a thermionic generator, the source electrodes are at the collector radiator of the generator.

Figure 3:
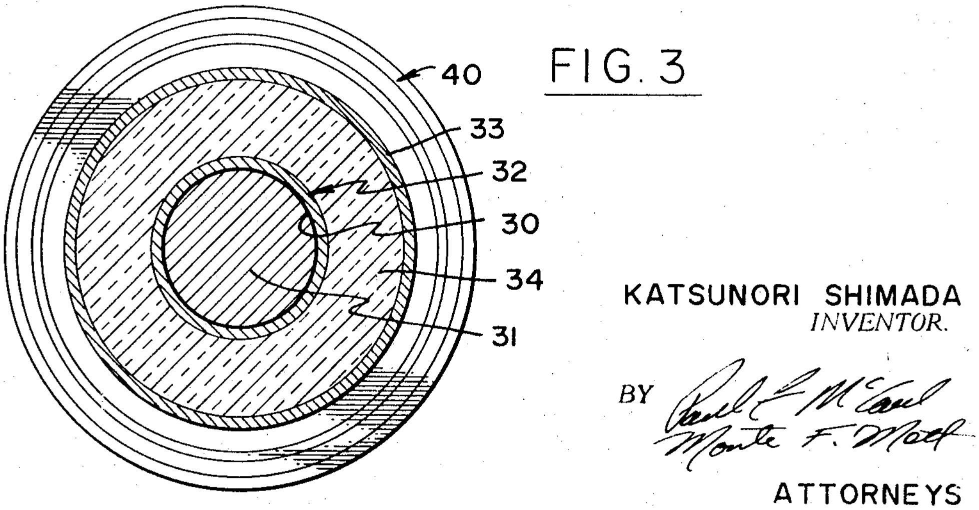
Figure 5:
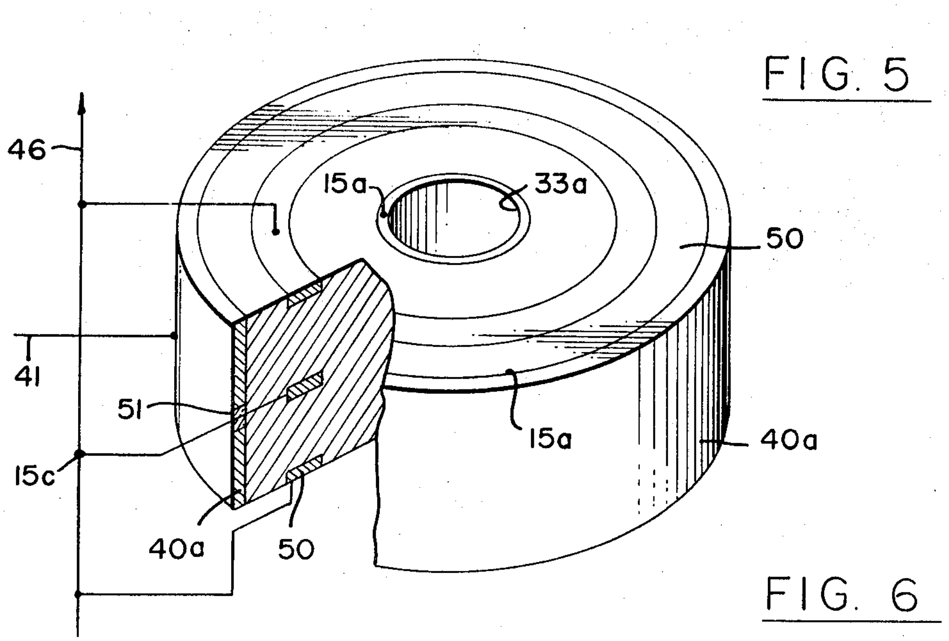
FIG. 5 is an isometric view of one embodiment of a solid-state switch of the present invention.

As is appreciated from FIGS. 2–4, herebefore it was assumed that each of switches 15 and 16 is shaped like a ring or doughnut which surrounds the cold shoe portion **33*a*. Also it was assumed as shown in FIG. 4 that two gate regions 50 are formed in each switch. Clearly for high-current densities the height of the switch may require more than two gate regions as shown in FIG. 5, in which an internal gate region is assumed to be included. FIG. 5 is an isometric view of a ring shaped switch in accordance with the present invention. In such an embodiment, a lead extends from each outer gate region to the switch's gate terminal such as 15*c*. Also a lead extends from the internal gate region through an appropriate insulator 51 in the heat sink portion 40*a*, which forms the switch's drain electrode, to terminal 15*c***. Such a construction is required to insure that all the gate regions are tied together to the gate terminal.

Herebefore in FIG. 1 the plus (+) terminal **33*a* of the generator is shown connected to each end of primary winding 12 through a single solid-state switch. Such an example is intended to represent only one arrangement. Clearly several switches may be connected in series or parallel. A parallel connection of two switches 15A and 15B assumed to replace single switch 15 is shown in FIG. 6**.

Figure 7:
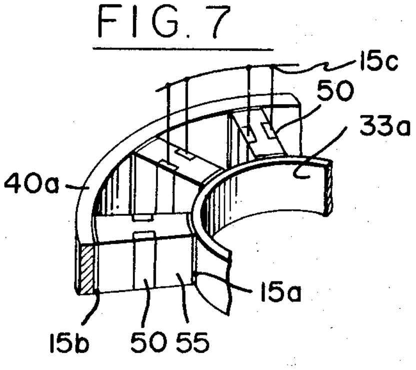
FIG. 7 is a partial isometric view of another embodiment of the invention.

Herebefore each switch has been assumed to be of the junction FET type. If desired switches of transistor type construction may be employed. Also each of the ring shaped switches may be replaced by a comb type structure, as shown in FIG. 7. In such an arrangement assumed to replace switch 15, a plurality of discrete switches 55 are employed. The switches extend radially outwardly around the cold shoe portion **33*a* which forms a source electrode common to all the switches. The drain electrodes of all of switches 55 which are tied together to terminal 15*b* are in direct contact with heat sink 40*a*, while their source electrodes, which are in direct contact with the cold shoe portion 33*a*, are tied together to terminal 15*a*. Likewise, all the gate regions 50 are tied together to the gate terminal 15*c*. A similar multiswitch arrangement is employed for switch 16**. Such a construction may simplify the fabrication of the switches though it increases the complexity of the required interconnections.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A thermal to electrical power system comprising:
means for converting thermal energy to electrical energy, said means including an outer surface at a first temperature, defining a first output terminal, and a second output terminal;
solid-state means exhibiting Seebeck effect characteristics, and including first, second and third electrodes, said first electrode being in direct contact with said outer surface, said second electrode being positioned remotely from said outer surface at a temperature lower than said first temperature;
load means connected to said second output terminal of said source and to the second electrode of said solid-state means; and
control means connected to said third electrode of said solid-state means for controlling the state of conduction of said solid-state means, with the temperature difference between said first and second terminals of said solid-state means producing a Seebeck voltage across said solid-state means for counteracting the ohmic voltage drop across said solid-state means produced as a function of the current flowing therethrough from its first to second terminals and its internal resistance.

2. The arrangement as recited in claim 1 wherein the temperature difference between said first and second electrodes of said solid-state means is about 300° K.

3. The arrangement as recited in claim 1 wherein said solid-state means has a Seebeck coefficient of $3\times10^{-4}$ volt/°K.

4. The arrangement as recited in claim 3 wherein the temperature difference between said first and second electrodes of said solid state means is about 300° K.

5. The arrangement as recited in claim 1 wherein said source is a thermoelectric generator having an outer cold shoe at said first temperature with said outer surface being the outer surface of said cold shoe, and said solid-state means extend from said cold shoe defining said first electrode to a heat sink, defining the second electrode of said solid-state means.

6. The arrangement as recited in claim 5 wherein the temperature difference between said first and second electrodes of said solid-state means is about 300° K. and said solid-state means has a Seebeck coefficient in a range including the value of $3\times10^{-4}$ volt/°K.

7. The arrangement as recited in claim 1 wherein said solid-state means includes first and second solid-state switches and said load means comprises a step-up transformer having a primary winding with a center tap and a secondary winding, means connecting the second output terminal of said source to said center tap and the second electrodes of said first and second switches to opposite ends of said primary winding, with the first electrodes of said first and second switches in direct contact with said outer surface, and the third electrodes connected to said control means.

8. The arrangement as recited in claim 7 wherein the temperature difference between said first and second electrodes of said solid-state means is about 300° K.

9. The arrangement as recited in claim 8 wherein said solid-state means has a Seebeck coefficient of $3\times10^{-4}$ volt/°K.

10. The arrangement as recited in claim 7 wherein said source is a thermoelectric generator having an outer cold shoe at said first temperature with said outer surface being the outer surface of said cold shoe, and said solid-state means extend from said cold shoe defining said first electrode to a heat sink, defining the second electrode of said solid-state means.

11. The arrangement as recited in claim 10 wherein the temperature difference between said first and second electrodes of said solid-state means is about 300° K. and said solid-state means has a Seebeck coefficient of $3\times10^{-4}$ volt/°K.

* * * * *